(No Model.)
B. F. MOORE.
CORN CUTTER.
No. 410,371.  Patented Sept. 3, 1889.
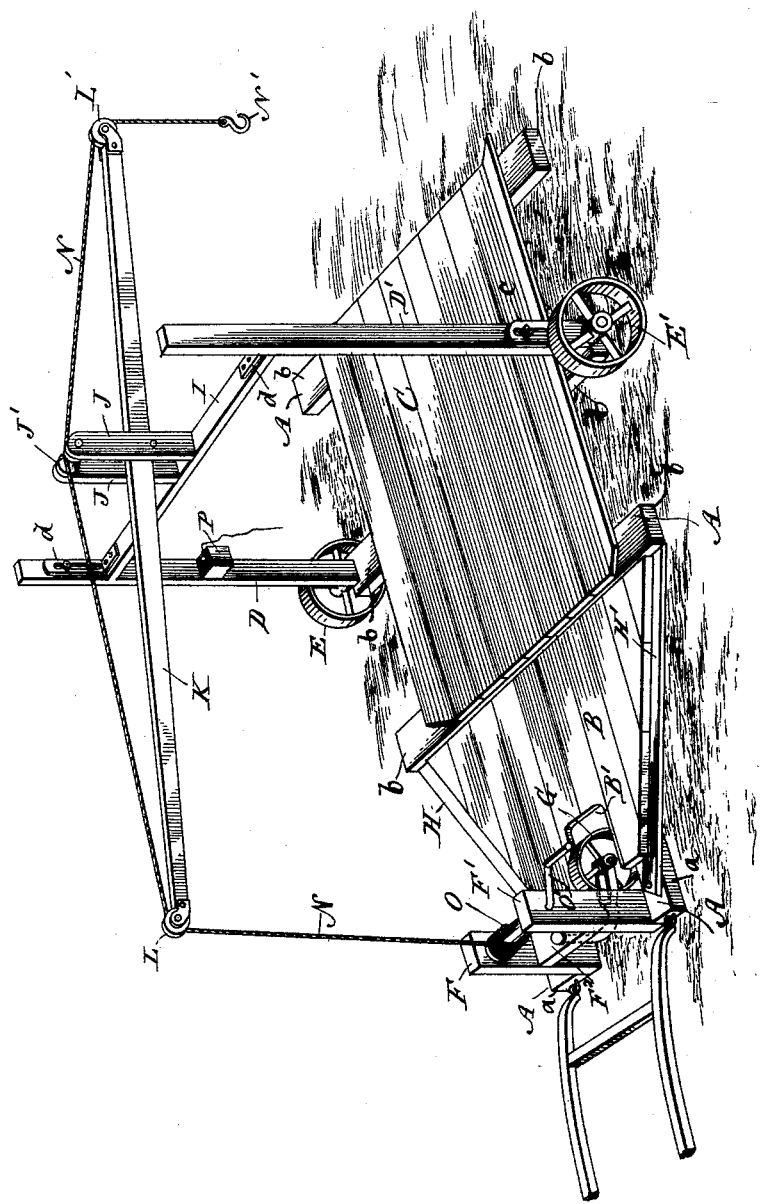
WITNESSES:
D. C. Reusch.
C. Sedgwick
INVENTOR:
B. F. Moore
BY Munn & Co.
ATTORNEYS.

UNITED STATES PATENT OFFICE.

BENJAMIN F. MOORE, OF IVANHOE, KANSAS.

CORN-CUTTER.

SPECIFICATION forming part of Letters Patent No. 410,371, dated September 3, 1889.

Application filed December 27, 1888. Serial No. 294,804. (No model.)

*To all whom it may concern:*

Be it known that I, BENJAMIN F. MOORE, of Ivanhoe, in the county of Haskell and State of Kansas, have invented a new and Improved Corn-Cutter, of which the following is a full, clear, and exact description.

The object of the invention is to provide a new and improved corn-cutter which is simple and durable in construction and very effective in operation, being specially designed to cut corn in the field, gather it, and set it up in shocks.

The invention consists of a wheeled platform provided with fixed knives and carrying means for setting up the shock in the field.

The invention also consists in certain parts and details and combinations of the same, as will be fully described hereinafter, and then pointed out in the claims.

Reference is to be had to the accompanying drawing, forming a part of this specification, in which the figure is a perspective view of the improvement.

The improved corn-cutter is provided with a frame A, formed of the longitudinal beams *a* and cross-beams *b*, on the top of which are secured the platforms B and C, located one behind the other. The platform C is slightly higher than the platform B, so that it will not drag on or catch the stubs of the stalks that remain in the ground. To the central cross-beam *b* of the frame A are held the posts D and D', carrying the vertically-adjustable wheels E E', traveling on the ground. On the front of the frame A are erected the posts F and F', connected with each other by the transverse beam F², on which is mounted to swing a caster-wheel G, extending into a recess B', formed in the front platform B. The wheels E and E' are mounted on axles projecting from plates *c*, which are slotted to receive the bolts by which the plates are secured to the said standards. By this means the wheels can be adjusted to raise or lower the frame A, so as to cut higher or lower, as desired.

On the sides of the triangularly-shaped platform B are arranged the knives H and H', secured by suitable means on the frame A and standing obliquely to each other. Between the posts D and D' is held vertically adjustable a transverse beam I, supporting in its middle the short posts J J, between which is fulcrumed a lever K, carrying on its ends the pulleys L and L', over which passes a rope N, provided at its rear end with a hook N', and also passing over a pulley J', held to turn between the upper ends of the short posts J. The front end of the rope N winds on a windlass O, of any approved construction, and mounted on the posts F and F'. The windlass is provided with the usual crank-arm O', for winding or unwinding the rope N whenever desired. The beam I is secured to the standards D D' by angle-plates *d*. One member of each plate is slotted, through which pass the bolts that secure them to the standards D D'. By this construction the beam can be readily adjusted to suit the size of the corn being cut.

A twine-box P, of any approved construction, is secured on one of the posts D or D'.

The operation is as follows: To the front end of the frame A is hitched a horse or two horses, one in front of the other, serving to propel the wheeled frame forward. The horse travels between two rows of corn, so that the forward motion of the wheeled frame brings the knives H and H' in contact with the two rows of corn, so that the said knives cut the cornstalks at any desired height from the ground, according to the adjustment of the wheels E and E'. Two men stand on the platform B, directly behind the knives H and H', and gather the corn cut by the knives. The corn is then placed on the platform C, and when a sufficient quantity is accumulated to form a shock the forward motion of the frame A is interrupted and one of the men draws the free end of the rope N around the gathered corn on the platform C and hooks the hook N' over the rope N, and then draws the latter tight, so as to bale the shock. The piece of twine from the box P is then tied around the corn, after which the operator turns the windlass O, so as to wind up the rope N, whereby the bundled shock is drawn rearward and upward as the front end of the lever K swings downward until the shock swings clear of the platform C, and its butt-end can be set on the ground at the rear of the platform C. The operator then unhooks the hook N', the lever K is moved to its former position, as shown in the drawing, and the men resume their positions on the platform B, after which the frame A is drawn forward and the above-described operation is repeated. Thus it will be seen that the corn is cut and formed into a shock, which latter is set up on the ground with great ease and without much help.

Having thus described my invention, what I claim as new, and desire to secure by Letters Patent, is—

1. A corn-cutter comprising a frame mounted on wheels and provided with two platforms, the front platform being triangular and in a different plane from the rear one, knives secured to the sides of the forward triangular platform, standards projecting from the frame, an adjustable beam connecting the standards, a lever pivoted on the beam and provided with guide-pulleys, a windlass at the front of the frame, and a rope secured to the windlass and passing over the guide-pulleys of the lever, substantially as described.

2. In a corn-cutter, the combination, with a frame mounted on wheels and provided with oblique cutters at its forward end and a windlass at the forward end of the frame, of the standards D D', secured to the frame, the beam I, adjustably secured to the standards and provided with the posts J, carrying guide-rollers J', the lever K, pivoted between the said posts and provided with the guide-rollers L L', and the rope N, secured to the windlass and passing over the said guide-pulleys, substantially as herein shown and described.

BENJAMIN F. MOORE.

Witnesses:
J. N. KERN,
C. W. WADSWORTH.